United States Patent
Flemming et al.

(10) Patent No.: US 11,367,939 B2
(45) Date of Patent: Jun. 21, 2022

(54) COUPLED TRANSMISSION LINE RESONATE RF FILTER

(71) Applicant: 3D Glass Solutions, Inc., Albuquerque, NM (US)

(72) Inventors: Jeb H. Flemming, Albuquerque, NM (US); Kyle McWethy, Albuquerque, NM (US)

(73) Assignee: 3D Glass Solutions, Inc., Albuquerque, NM (US)

( * ) Notice: Subject to any disclaimer, the term of this patent is extended or adjusted under 35 U.S.C. 154(b) by 16 days.

(21) Appl. No.: 17/030,089

(22) Filed: Sep. 23, 2020

(65) Prior Publication Data

US 2021/0005949 A1 Jan. 7, 2021

Related U.S. Application Data

(63) Continuation of application No. 16/219,362, filed on Dec. 13, 2018, now Pat. No. 10,854,946.
(Continued)

(51) Int. Cl.
*H01P 11/00* (2006.01)
*H01P 1/203* (2006.01)
(Continued)

(52) U.S. Cl.
CPC ....... *H01P 11/003* (2013.01); *H01H 59/0009* (2013.01); *H01P 1/20336* (2013.01); *H01P 1/2135* (2013.01)

(58) Field of Classification Search
CPC .. H01P 11/003; H01P 1/20336; H01P 1/2135; H01H 59/0009; H01L 23/15;
(Continued)

(56) References Cited

U.S. PATENT DOCUMENTS

| | | | |
|---|---|---|---|
| 2,515,940 | A | 7/1950 | Stookey |
| 2,515,941 | A | 7/1950 | Stookey |

(Continued)

FOREIGN PATENT DOCUMENTS

| | | |
|---|---|---|
| CN | 1562831 A | 4/2004 |
| CN | 105938928 | 9/2016 |

(Continued)

OTHER PUBLICATIONS

International Search Report and Written Opinion for PCT/US2021/21371 dated May 20, 2021 by the USPTO, 10 pp.
(Continued)

*Primary Examiner* — Rakesh B Patel
*Assistant Examiner* — Jorge L Salazar, Jr.
(74) *Attorney, Agent, or Firm* — Edwin S. Flores; Chalker Flores, LLP

(57) ABSTRACT

The present invention includes a method of creating electrical air gap low loss low cost RF mechanically and thermally stabilized interdigitated resonate filter in photo definable glass ceramic substrate. Where a ground plane may be used to adjacent to or below the RF filter in order to prevent parasitic electronic signals, RF signals, differential voltage build up and floating grounds from disrupting and degrading the performance of isolated electronic devices by the fabrication of electrical isolation and ground plane structures on a photo-definable glass substrate.

25 Claims, 4 Drawing Sheets

Related U.S. Application Data

(60) Provisional application No. 62/599,504, filed on Dec. 15, 2017.

(51) Int. Cl.
*H01H 59/00* (2006.01)
*H01P 1/213* (2006.01)

(58) Field of Classification Search
CPC ... H05K 2201/017; H05K 2201/10098; H01Q 9/04; C03C 4/04; C03C 3/095; C03C 3/068; C03C 3/06; C03C 3/078; C03C 3/102; C03C 2201/10; C03C 2201/36; C03C 2201/40; C03C 2201/50; C03C 2201/23; C03C 2201/30; C03C 2201/54
USPC ........................................ 333/204, 238, 246
See application file for complete search history.

(56) References Cited

U.S. PATENT DOCUMENTS

| | | |
|---|---|---|
| 2,628,160 A | 2/1953 | Stookey |
| 2,684,911 A | 7/1954 | Stookey |
| 2,971,853 A | 2/1961 | Stookey |
| 3,281,264 A | 10/1966 | Cape et al. |
| 3,904,991 A | 9/1975 | Ishli et al. |
| 3,985,531 A | 10/1976 | Grossman |
| 3,993,401 A | 11/1976 | Strehlow |
| 4,029,605 A | 6/1977 | Kosiorek |
| 4,131,516 A | 12/1978 | Bakos et al. |
| 4,413,061 A | 11/1983 | Kumar |
| 4,444,616 A | 4/1984 | Fujita et al. |
| 4,514,053 A | 4/1985 | Borelli et al. |
| 4,537,612 A | 8/1985 | Borelli et al. |
| 4,647,940 A | 3/1987 | Traut et al. |
| 4,692,015 A | 9/1987 | Loce et al. |
| 4,788,165 A | 11/1988 | Fong et al. |
| 4,942,076 A | 7/1990 | Panicker et al. |
| 5,078,771 A | 1/1992 | Wu |
| 5,147,740 A | 9/1992 | Robins |
| 5,212,120 A | 5/1993 | Araujo et al. |
| 5,215,610 A | 6/1993 | Dipaolo et al. |
| 5,352,996 A | 10/1994 | Kawaguchi |
| 5,371,466 A | 12/1994 | Arakawa et al. |
| 5,374,291 A | 12/1994 | Yabe et al. |
| 5,395,498 A | 3/1995 | Gombinsky et al. |
| 5,409,741 A | 4/1995 | Laude |
| 5,733,370 A | 3/1998 | Chen et al. |
| 5,779,521 A | 7/1998 | Muroyama et al. |
| 5,850,623 A | 12/1998 | Carman, Jr. et al. |
| 5,902,715 A | 5/1999 | Tsukamoto et al. |
| 5,919,607 A | 7/1999 | Lawandy et al. |
| 5,998,224 A | 12/1999 | Rohr et al. |
| 6,066,448 A | 5/2000 | Wohlstadter et al. |
| 6,094,336 A | 7/2000 | Weekamp |
| 6,136,210 A | 10/2000 | Biegelsen et al. |
| 6,171,886 B1 | 1/2001 | Ghosh |
| 6,258,497 B1 | 7/2001 | Kropp et al. |
| 6,287,965 B1 | 9/2001 | Kang et al. |
| 6,329,702 B1 | 12/2001 | Gresham et al. |
| 6,373,369 B2 | 4/2002 | Huang et al. |
| 6,383,566 B1 | 5/2002 | Zagdoun |
| 6,485,690 B1 | 11/2002 | Pfost et al. |
| 6,495,411 B1 | 12/2002 | Mei |
| 6,511,793 B1 | 1/2003 | Cho et al. |
| 6,514,375 B2 | 2/2003 | Kijima |
| 6,562,523 B1 | 2/2003 | Wu et al. |
| 6,678,453 B2 | 1/2004 | Bellman et al. |
| 6,686,824 B1 | 2/2004 | Yamamoto et al. |
| 6,771,860 B2 | 8/2004 | Trezza et al. |
| 6,783,920 B2 | 8/2004 | Livingston et al. |
| 6,824,974 B2 | 11/2004 | Pisharody et al. |
| 6,843,902 B1 | 1/2005 | Penner et al. |
| 6,875,544 B1 | 4/2005 | Sweatt et al. |
| 6,932,933 B2 | 8/2005 | Halvajian et al. |
| 6,977,722 B2 | 12/2005 | Wohlstadter et al. |
| 7,033,821 B2 | 4/2006 | Kim et al. |
| 7,064,045 B2 | 6/2006 | Kang |
| 7,132,054 B1 | 11/2006 | Kravitz et al. |
| 7,179,638 B2 | 2/2007 | Anderson |
| 7,306,689 B2 | 12/2007 | Okubora et al. |
| 7,326,538 B2 | 2/2008 | Pitner et al. |
| 7,407,768 B2 | 8/2008 | Yamazaki et al. |
| 7,410,763 B2 | 8/2008 | Su et al. |
| 7,470,518 B2 | 12/2008 | Chiu et al. |
| 7,497,554 B2 | 3/2009 | Okuno |
| 7,603,772 B2 | 10/2009 | Farnsworth et al. |
| 7,948,342 B2 | 5/2011 | Long |
| 8,062,753 B2 | 11/2011 | Schreder et al. |
| 8,076,162 B2 | 12/2011 | Flemming et al. |
| 8,096,147 B2 | 1/2012 | Flemming et al. |
| 8,361,333 B2 | 1/2013 | Flemming et al. |
| 8,492,315 B2 | 7/2013 | Flemming et al. |
| 8,709,702 B2 | 4/2014 | Flemming et al. |
| 9,385,083 B1 | 7/2016 | Herrault et al. |
| 9,449,753 B2 | 9/2016 | Kim |
| 9,635,757 B1 | 4/2017 | Chen et al. |
| 9,755,305 B2 | 9/2017 | Desclos et al. |
| 9,819,991 B1 | 11/2017 | Rajagopalan et al. |
| 10,070,533 B2 | 9/2018 | Flemming et al. |
| 10,201,901 B2 | 2/2019 | Flemming et al. |
| 10,854,946 B2 * | 12/2020 | Flemming ........... H01P 1/20336 |
| 2001/0051584 A1 | 12/2001 | Harada et al. |
| 2002/0015546 A1 | 2/2002 | Bhagavatula |
| 2002/0086246 A1 | 7/2002 | Lee |
| 2002/0100608 A1 | 8/2002 | Fushie et al. |
| 2003/0025227 A1 | 2/2003 | Daniell |
| 2003/0124716 A1 | 7/2003 | Hess et al. |
| 2003/0135201 A1 | 7/2003 | Gonnelli |
| 2003/0156819 A1 | 8/2003 | Pruss et al. |
| 2003/0174944 A1 | 9/2003 | Dannoux |
| 2003/0228682 A1 | 12/2003 | Lakowicz et al. |
| 2003/0231830 A1 | 12/2003 | Hikichi |
| 2004/0008391 A1 | 1/2004 | Bowley et al. |
| 2004/0020690 A1 | 2/2004 | Parker et al. |
| 2004/0155748 A1 | 8/2004 | Steingroever |
| 2004/0171076 A1 | 9/2004 | Dejneka et al. |
| 2004/0184705 A1 | 9/2004 | Shimada et al. |
| 2004/0198582 A1 | 10/2004 | Borrelli et al. |
| 2004/0227596 A1 | 11/2004 | Nguyen et al. |
| 2005/0089901 A1 | 4/2005 | Porter et al. |
| 2005/0105860 A1 | 5/2005 | Oono |
| 2005/0150683 A1 | 7/2005 | Farnworth et al. |
| 2005/0170670 A1 | 8/2005 | King et al. |
| 2005/0212432 A1 | 9/2005 | Neil et al. |
| 2005/0277550 A1 | 12/2005 | Brown et al. |
| 2006/0092079 A1 | 5/2006 | Rochemont |
| 2006/0118965 A1 | 6/2006 | Matsui |
| 2006/0147344 A1 | 7/2006 | Ahn et al. |
| 2006/0158300 A1 | 7/2006 | Korony et al. |
| 2006/0159916 A1 | 7/2006 | Dubrow et al. |
| 2006/0177855 A1 | 8/2006 | Utermohlen et al. |
| 2006/0188907 A1 | 8/2006 | Lee et al. |
| 2006/0283948 A1 | 12/2006 | Naito |
| 2007/0120263 A1 | 5/2007 | Gabric et al. |
| 2007/0121263 A1 | 5/2007 | Liu et al. |
| 2007/0155021 A1 | 7/2007 | Zhang et al. |
| 2007/0158787 A1 | 7/2007 | Chanchani |
| 2007/0248126 A1 | 10/2007 | Liu et al. |
| 2007/0267708 A1 | 11/2007 | Courcimault |
| 2007/0279837 A1 | 12/2007 | Chow et al. |
| 2007/0296520 A1 | 12/2007 | Hosokawa et al. |
| 2008/0136572 A1 | 6/2008 | Ayasi et al. |
| 2008/0174976 A1 | 7/2008 | Satoh et al. |
| 2008/0182079 A1 | 7/2008 | Mirkin et al. |
| 2008/0223603 A1 | 9/2008 | Kim et al. |
| 2008/0226228 A1 | 9/2008 | Tamurar |
| 2008/0245109 A1 | 10/2008 | Flemming et al. |
| 2008/0291442 A1 | 11/2008 | Lawandy |
| 2008/0305268 A1 | 12/2008 | Norman et al. |
| 2008/0316678 A1 | 12/2008 | Ehrenberg et al. |
| 2009/0029185 A1 | 1/2009 | Lee et al. |
| 2009/0075478 A1 | 3/2009 | Matsui |
| 2009/0130736 A1 | 5/2009 | Collis et al. |

(56) References Cited

U.S. PATENT DOCUMENTS

| | | | |
|---|---|---|---|
| 2009/0170032 A1 | 7/2009 | Takahashi et al. |
| 2009/0182720 A1 | 7/2009 | Cain et al. |
| 2009/0243783 A1 | 10/2009 | Fouquet et al. |
| 2010/0022416 A1 | 1/2010 | Flemming et al. |
| 2010/0059265 A1 | 3/2010 | Myung-Soo |
| 2010/0237462 A1 | 9/2010 | Beker et al. |
| 2011/0003422 A1 | 1/2011 | Katragadda et al. |
| 2011/0045284 A1 | 2/2011 | Matsukawa et al. |
| 2011/0065662 A1 | 3/2011 | Rinsch et al. |
| 2011/0108525 A1 | 5/2011 | Chien et al. |
| 2011/0170273 A1 | 7/2011 | Helvajian |
| 2011/0195360 A1 | 8/2011 | Flemming et al. |
| 2011/0217657 A1 | 9/2011 | Flemming et al. |
| 2011/0284725 A1 | 11/2011 | Goldberg |
| 2011/0304999 A1 | 12/2011 | Yu et al. |
| 2012/0080612 A1 | 4/2012 | Grego |
| 2012/0161330 A1 | 6/2012 | Hlad et al. |
| 2013/0001770 A1 | 1/2013 | Liu |
| 2013/0015467 A1 | 1/2013 | Krumbein et al. |
| 2013/0119401 A1 | 5/2013 | D'Evelyn et al. |
| 2013/0142998 A1 | 6/2013 | Flemming et al. |
| 2013/0209026 A1 | 8/2013 | Doany et al. |
| 2013/0233202 A1 | 9/2013 | Cao et al. |
| 2013/0278568 A1 | 10/2013 | Lasiter et al. |
| 2013/0308906 A1 | 11/2013 | Zheng et al. |
| 2013/0337604 A1 | 12/2013 | Ozawa et al. |
| 2014/0002906 A1 | 1/2014 | Shibuya |
| 2014/0035540 A1 | 2/2014 | Ehrenberg |
| 2014/0035892 A1 | 2/2014 | Shenoy |
| 2014/0035935 A1 | 2/2014 | Shenoy et al. |
| 2014/0070380 A1 | 3/2014 | Chiu et al. |
| 2014/0104284 A1 | 4/2014 | Shenoy et al. |
| 2014/0144681 A1 | 5/2014 | Pushparaj et al. |
| 2014/0145326 A1 | 5/2014 | Lin et al. |
| 2014/0169746 A1 | 6/2014 | Hung et al. |
| 2014/0203891 A1 | 7/2014 | Yazaki |
| 2014/0247269 A1 | 9/2014 | Berdy et al. |
| 2014/0272688 A1 | 9/2014 | Dillion |
| 2014/0367695 A1 | 12/2014 | Barlow |
| 2015/0048901 A1 | 2/2015 | Rogers |
| 2015/0071593 A1 | 3/2015 | Kanke |
| 2015/0210074 A1 | 7/2015 | Chen et al. |
| 2015/0263429 A1 | 9/2015 | Vahidpour et al. |
| 2015/0277047 A1 | 10/2015 | Flemming et al. |
| 2016/0048079 A1 | 2/2016 | Lee et al. |
| 2016/0152505 A1 | 6/2016 | Fushie |
| 2016/0181211 A1 | 6/2016 | Kamaging et al. |
| 2016/0185653 A1 | 6/2016 | Fushie |
| 2016/0254579 A1 | 9/2016 | Mills |
| 2016/0265974 A1 | 9/2016 | Erte et al. |
| 2016/0268665 A1 | 9/2016 | Sherrer et al. |
| 2016/0320568 A1 | 11/2016 | Haase |
| 2016/0380614 A1 | 12/2016 | Abbott et al. |
| 2017/0003421 A1 | 1/2017 | Flemming et al. |
| 2017/0094794 A1 | 3/2017 | Flemming et al. |
| 2017/0098501 A1 | 4/2017 | Flemming et al. |
| 2017/0213762 A1 | 7/2017 | Gouk |
| 2018/0323485 A1 | 11/2018 | Gnanou et al. |
| 2019/0280079 A1 | 7/2019 | Bouvier et al. |
| 2020/0235020 A1 | 7/2020 | Boek |
| 2020/0275558 A1 | 8/2020 | Fujita |

FOREIGN PATENT DOCUMENTS

| | | |
|---|---|---|
| CN | 210668058 U | 6/2020 |
| DE | 102004059252 A1 | 1/2006 |
| EP | 0311274 A1 | 12/1989 |
| EP | 0507719 A1 | 10/1992 |
| EP | 0685857 B1 | 12/1995 |
| EP | 0949648 A1 | 10/1999 |
| EP | 1487019 A1 | 12/2004 |
| EP | 1683571 A1 | 6/2006 |
| JP | 61149905 | 7/1986 |
| JP | 61231529 A | 10/1986 |
| JP | 62202840 A | 9/1987 |
| JP | 63-128699 A | 6/1988 |
| JP | 08026767 A | 6/1988 |
| JP | H393683 A | 4/1991 |
| JP | 05139787 A | 6/1993 |
| JP | 08179155 A | 12/1994 |
| JP | 10007435 A | 1/1998 |
| JP | 10199728 A | 7/1998 |
| JP | 11344648 A | 12/1999 |
| JP | 2000228615 A | 8/2000 |
| JP | 2001033664 A | 2/2001 |
| JP | 2001206735 A | 7/2001 |
| JP | 2005302987 A | 10/2005 |
| JP | 2005215644 A | 11/2005 |
| JP | 2006179564 A | 6/2006 |
| JP | 2008252797 A | 10/2008 |
| JP | 2012079960 A | 4/2012 |
| JP | 2013062473 A | 4/2013 |
| JP | 2013217989 A | 10/2013 |
| JP | 2014241365 A | 12/2014 |
| JP | 2015028651 A | 2/2015 |
| JP | H08026767 A | 1/2016 |
| JP | 2018200912 A | 12/2018 |
| KR | 100941691 B1 | 2/2010 |
| KR | 101167691 B1 | 7/2012 |
| WO | 2007088058 A1 | 8/2007 |
| WO | 2008119080 A1 | 10/2008 |
| WO | 2008154931 A1 | 12/2008 |
| WO | 2009029733 A2 | 3/2009 |
| WO | 2009062011 A1 | 5/2009 |
| WO | 2009126649 A2 | 10/2009 |
| WO | 2010011939 A2 | 1/2010 |
| WO | 2011100445 A1 | 8/2011 |
| WO | 2011109648 A1 | 9/2011 |
| WO | 2012078213 A1 | 6/2012 |
| WO | 2014062226 A1 | 1/2014 |
| WO | 2014043267 A1 | 3/2014 |
| WO | 2014062311 A1 | 4/2014 |
| WO | 2015108648 A1 | 7/2015 |
| WO | 2015112903 A1 | 7/2015 |
| WO | 2015171597 A1 | 11/2015 |
| WO | 2017132280 A2 | 8/2017 |
| WO | 2017147511 A1 | 8/2017 |
| WO | 2017177171 A1 | 10/2017 |
| WO | 2018200804 A1 | 1/2018 |
| WO | 2019010045 A1 | 1/2019 |
| WO | 2019118761 A1 | 6/2019 |
| WO | 2019136024 A1 | 7/2019 |
| WO | 2019199470 A1 | 10/2019 |
| WO | 2019231947 A1 | 12/2019 |

OTHER PUBLICATIONS

European Search Report and Supplemental European Search Report for EP 19784673.6 dated Feb. 2, 2021, 8 pp.

European Search Report and Supplemental European Search Report for EP 19811031 4 dated Feb. 26, 2021, 7 pp.

Dang, et al. "Integrated thermal-fluidic I/O interconnects for an on-chip microchannel heat sink," IEEE Electron Device Letters, vol. 27, No. 2, pp. 117-119, 2006.

Dietrich, T.R., et al., "Fabrication Technologies for Microsystems Utilizing Photoetchable Glass," Microelectronic Engineering 30, (1996), pp. 407-504.

Extended European Search Report 15741032.5 dated Aug. 4, 2017, 11 pp.

Extended European Search Report 15789595.4 dated Mar. 31, 2017, 7 pp.

Extended European Search Report 17744848.7 dated Oct. 30, 2019, 9 pp.

Extended European Search Report 17757365.6 dated Oct. 14, 2019, 14 pp.

Geddes, et al, "Metal-Enhanced Fluorescence" J Fluorescence, (2002), 12:121-129.

Gomez-Morilla, et al. "Micropatterning of Foturan photosensitive glass following exposure to MeV proton beams" Journal of Micromechanics and Microengineering, vol. 15, 2005, pp. 706-709, DOI:10.1088/0960-1317/15/4/006.

(56) References Cited

OTHER PUBLICATIONS

Intel Corporation, "Intel® 82566 Layout Checklist (version 1.0)", 2006.
International Search Report and Written Opinion for PCT/US2008/058783 dated Jul. 1, 2008, 15 pp.
International Search Report and Written Opinion for PCT/US2008/074699 dated Feb. 26, 2009, 11 pp.
International Search Report and Written Opinion for PCT/US2009/039807 dated Nov. 24, 2009, 13 pp.
International Search Report and Written Opinion for PCT/US2009/051711 dated Mar. 5, 2010, 15 pp.
International Search Report and Written Opinion for PCT/US2011/024369 dated Mar. 25, 2011, 13 pp.
International Search Report and Written Opinion for PCT/US2013/059305 dated Jan. 10, 2014, 6 pp.
International Search Report and Written Opinion for PCT/US2015/012758 dated Apr. 8, 2015, 11 pp.
International Search Report and Written Opinion for PCT/US2015/029222 dated Jul. 22, 2015, 9 pp.
International Search Report and Written Opinion for PCT/US2017/019483 dated May 19, 2017, 11 pp.
International Search Report and Written Opinion for PCT/US2017/026662 dated Jun. 5, 2017, 11 pp.
International Search Report and Written Opinion for PCT/US2018/029559 dated Aug. 3, 2018, 9 pp.
International Search Report and Written Opinion for PCT/US2018/039841 dated Sep. 20, 2018 by Australian Patent Office, 12 pp.
International Search Report and Written Opinion for PCT/US2018/065520 dated Mar. 20, 2019 by Australian Patent Office, 11 pp.
International Search Report and Written Opinion for PCT/US2018/068184 dated Mar. 19, 2019 by Australian Patent Office, 11 pp.
International Search Report and Written Opinion for PCT/US2019/024496 dated Jun. 20, 2019 by Australian Patent Office, 9 pp.
International Search Report and Written Opinion for PCT/US2019/34245 dated Aug. 9, 2019 by Australian Patent Office, 10 pp.
International Search Report and Written Opinion for PCT/US2019/50644 dated Dec. 4, 2019 by USPTO, 9 pp.
International Technology Roadmap for Semiconductors, 2007 Edition, "Assembly and Packaging," 9 pages.
Kamagaing, et al., "Investigation of a photodefinable glass substrate for millimeter-wave radios on package," Proceeds of the 2014 IEEE 64th Electronic Components and Technology Conference, May 27, 2014, pp. 1610-1615.
Lakowicz, et al; "Advances in Surface-Enhanced Fluorescence", J Fluorescence, (2004), 14:425-441.
Lewis, Sr., "Hawley's Condensed Chemical Dictionary." 13th ed, 1997, John Wiley and Sons. p. 231.
Lin, C.H., et al., "Fabrication of Microlens Arrays in Photosensitive Glass by Femtosecond Laser Direct Writing," Appl Phys A (2009) 97:751-757.
Livingston, F.E., et al., "Effect of Laser Parameters on the Exposure and Selective Etch Rate in Photostructurable Glass," SPIE vol. 4637 (2002); pp. 404-412.
Lyon, L.A., et al., "Raman Spectroscopy," Anal Chem (1998), 70:341R-361R.
Papapolymerou, I., et al., "Micromachined patch antennas," IEEE Transactions on Antennas and Propagation, vol. 46, No. 2, 1998, pp. 275-283.
Perro, A., et al., "Design and synthesis of Janus micro- and nanoparticles," J Mater Chem (2005), 15:3745-3760.
Quantum Leap, "Liquid Crystal Polymer (LCP) LDMOS Packages," Quantum Leap Datasheet, (2004), miconnelly.com/QLPKG. Final_LDMOS_DataSheet.pdf, 2 pages.
Scrantom, Charles Q., "LTCC Technology—Where We Are and Where We're Going—IV," Jun. 2000, 12 pages.
Wang, et al. "Optical waveguide fabrication and integration with a micro-mirror inside photosensitive glass by femtosecond laser direct writing" Applied Physics A, vol. 88, 2007, pp. 699-704, DOI:10.1007/S00339-007-4030-9.
Zhang, H., et al., "Biofunctionalized Nanoarrays of Inorganic Structures Prepared by Dip-Pen Nanolithography," Nanotechnology (2003), 14:1113-1117.
Zhang, H., et al., Synthesis of Hierarchically Porous Silica and Metal Oxide Beads Using Emulsion-Templated Polymer Scaffolds, Chem Mater (2004), 16:4245-4256.
Chou, et al., "Design and Demonstration of Micro-mirrors and Lenses for Low Loss and Low Cost Single-Mode Fiber Coupling in 3D Glass Photonic Interposers," 2016 IEEE 66th Electronic Components and Technology Conference, May 31-Jun. 3, 7 pp.
Grine, F. et al., "High-Q Substrate Integrated Waveguide Resonator Filter With Dielectric Loading," IEEE Access vol. 5, Jul. 12, 2017, pp. 12526-12532.
Hyeon, I-J, et al., "Millimeter-Wave Substrate Integrated Waveguide Using Micromachined Tungsten-Coated Through Glass Silicon Via Structures," Micromachines, vol. 9, 172 Apr. 9, 2018, 9 pp.
Mohamedelhassan, A., "Fabrication of Ridge Waveguides in Lithium Niobate," Independent thesis Advanced level, KTH, School of Engineering Sciences, Physics, 2012, 68 pp.
Muharram, B., Thesis from University of Calgary Graduate Studies, "Substrate-Integrated Waveguide Based Antenna in Remote Respiratory Sensing," 2012, 97 pp.
Topper, et al., "Development of a high density glass interposer based on wafer level packaging technologies," 2014 IEEE 64th Electronic Components and Technology Conference, May 27, 2014, pp. 1498-1503.
International Search Report and Written Opinion for PCT/US2021/27499 dated Jun. 16, 2021 by the USPTO, 7 pp.
International Search Report and Written Opinion for PCT/US2020/28474 dated Jul. 17, 2020 by the USPTO, 7 pp.
Aslan, et al, "Metal-Enhanced Fluorescence: an emerging tool in biotechnology" Current opinion in Biotechnology (2005), 16:55-62.
Azad, I., et al., "Design and Performance Analysis of 2.45 GHz Microwave Bandpass Filter with Reduced Harmonics," International Journal of Engineering Research and Development (2013), 5(11):57-67.
Bakir, Muhannad S., et al., "Revolutionary Nanosilicon Ancillary Technologies for Ultimate-Performance Gigascale Systems," IEEE 2007 Custom Integrated Circuits Conference (CICC), 2007, pp. 421-428.
Beke, S., et al., "Fabrication of Transparent and Conductive Microdevices," Journal of Laser Micro/Nanoengineering (2012), 7(1):28-32.
Brusberg, et al. "Thin Glass Based Packaging Technologies for Optoelectronic Modules" Electronic Components and Technology Conference, May 26-29, 2009, pp. 207-212, DOI:10.1109/ECTC.2009.5074018, pp. 208-211; Figures 3, 8.
Cheng, et al. "Three-dimensional Femtosecond Laser Integration in Glasses" The Review of Laser Engineering, vol. 36, 2008, pp. 1206-1209, Section 2, Subsection 3.1.
Chowdhury, et al., "Metal-Enhanced Chemiluminescence", J Fluorescence (2006), 16:295-299.
Crawford, Gregory P., "Flexible Flat Panel Display Technology," John Wiley and Sons, NY, (2005), 9 pages.
European Search Report and Supplemental European Search Report for EP 18828907 dated Mar. 25, 2020, 11 pp.
International Search Report and Written Opinion for PCT/US2019/068586 dated Mar. 12, 2020 by USPTO, 10 pp.
International Search Report and Written Opinion for PCT/US2019/068590 dated Mar. 5, 2020 by USPTO, 9 pp.
International Search Report and Written Opinion for PCT/US2019/068593 dated Mar. 16, 2020 by USPTO, 8 pp.
International Search Report and Written Opinion for PCT/US2020/026673 dated Jun. 22, 2020, by the USPTO, 13 pp.
European Search Report and Supplemental European Search Report for EP 18889385.3 dated Dec. 2, 2020, 8 pp.
European Search Report and Supplemental European Search Report for EP 18898912.3 dated Feb. 2, 2021, 10 pp.
Green, S., "Heterogeneous Integration of DARPA: Pathfinding and Progress in Assembly Approaches," viewed on and retrieved from the Internet on Feb. 26, 2021, <URL:https://web.archive.org/web/20181008153224/https://www.ectc.net/files/68/Demmin%20Darpa.pdf>, published Oct. 8, 2018 per the Wayback Machine.

(56) References Cited

OTHER PUBLICATIONS

International Search Report and Written Opinion for PCT/US2020/54394 dated Jan. 7, 2021 by the USPTO, 15 pp.
Extended European Search Report for EP 19906040.1 dated Feb. 4, 2022, 16 pp.

* cited by examiner

COUPLED TRANSMISSION LINE RESONATE RF FILTER

CROSS-REFERENCE TO RELATED APPLICATIONS

This application is a continuation of U.S. patent application Ser. No. 16/219,362 filed on Dec. 13, 2018, now U.S. Pat. No. 10,854,946 issued on Dec. 1, 2020, which claims priority to U.S. Provisional Patent Application Ser. No. 62/599,504 filed Dec. 15, 2017, the contents of which is incorporated by reference herein in its entirety.

STATEMENT OF FEDERALLY FUNDED RESEARCH

None.

TECHNICAL FIELD OF THE INVENTION

The present invention relates to creating impedance matching between RF devices on the same substrate. Coupled Transmission Line Resonate Filter

BACKGROUND OF THE INVENTION

Without limiting the scope of the invention, its background is described in connection with impedance matching.

One such example is taught in U.S. Pat. No. 9,819,991, issued to Rajagopalan, et al., entitled "Adaptive impedance matching interface". These inventors are said to teach a device that includes a data interface connector, an application processor, and interface circuitry. Interface circuitry is said to be coupled between the application processor and the data interface connector, in which the data interface circuitry determines a change in a signal property of one of the signals, the change being caused by an impedance mismatch between the data interface connector and a media consumption device. The application processor is said to adjust the signal property of a subsequent one of the signals, in response to the signal property setting from the interface circuitry, to obtain an adjusted signal, or can send the adjusted signal to the media consumption device.

Another such example is taught in U.S. Pat. No. 9,755,305, issued to Desclos, et al., and entitled "Active antenna adapted for impedance matching and band switching using a shared component". Briefly, these inventors are said to teach an active antenna and associated circuit topology that is adapted to provide active impedance matching and band switching of the antenna using a shared tunable component, e.g., using a shared tunable component, such as a tunable capacitor or other tunable component. The antenna is said to provide a low cost and effective active antenna solution, e.g., one or more passive components can be further utilized to design band switching of the antenna from a first frequency to a second desired frequency.

However, despite these advances, a need remains compact low loss RF devices.

SUMMARY OF THE INVENTION

In one embodiment, the present invention includes a method of making a mechanically stabilized RF coupled interdigitated resonate device comprising: masking a design layout comprising one or more structures to form one or more interdigitated structures with electrical conduction channels on a photosensitive glass substrate; exposing at least one portion of the photosensitive glass substrate to an activating energy source; heating the photosensitive glass substrate for at least ten minutes above its glass transition temperature; cooling the photosensitive glass substrate to transform at least part of the exposed glass to a crystalline material to form a glass-crystalline substrate; etching the glass-crystalline substrate with an etchant solution to form a mechanical support device; and coating the one or more electrical conductive interdigitated transmission line, ground plane and input and output channels with one or more metals, wherein the metal is connected to a circuitry. In one aspect, the device is covered with a lid covering all or part of the external electrical isolation structure with a metal or metallic media further comprises connecting the metal or metallic media to a ground. In another aspect, the RF filter line has mechanical and thermal stabilization structure is under less than 50%, 40%, 35%, 30%, 25%, 20%, 10%, 5% or 1% of the contact area of the RF interdigitated resonate structure. In another aspect, the metallization forms a transmission line. In another aspect, the RF transmission line interdigitated resonate filter is a bandpass, low pass, high pass, or notch. In another aspect, a metal line on the RF transmission line interdigitated resonate filter is comprised of titanium, titanium-tungsten, chrome, copper, nickel, gold, palladium or silver. In another aspect, the step of etching forms an air gap between the substrate and the RF interdigitated resonate structure, wherein the interdigitated resonate structure is connected to other RF electronic elements. In another aspect, the glass-crystalline substrate adjacent to the trenches may also be converted to a ceramic phase. In another aspect, the one or more metals are selected from Fe, Cu, Au, Ni, In, Ag, Pt, or Pd. In another aspect, the metal is connected to the circuitry through a surface a buried contact, a blind via, a glass via, a straight line contact, a rectangular contact, a polygonal contact, or a circular contact. In another aspect, the photosensitive glass substrate is a glass substrate comprising a composition of: 60-76 weight % silica; at least 3 weight % $K_2O$ with 6 weight %-16 weight % of a combination of $K_2O$ and $Na_2O$; 0.003-1 weight % of at least one oxide selected from the group consisting of $Ag_2O$ and $Au_2O$; 0.003-2 weight % $Cu_2O$; 0.75 weight %-7 weight % $B_2O_3$, and 6-7 weight % $Al_2O_3$; with the combination of $B_2O_3$; and $Al_2O_3$ not exceeding 13 weight %; 8-15 weight % $Li_2O$; and 0.001-0.1 weight % $CeO_2$. In another aspect, the photosensitive glass substrate is a glass substrate comprising a composition of: 35-76 weight % silica, 3-16 weight % $K_2O$, 0.003-1 weight % $Ag_2O$, 8-15 weight % $Li_2O$, and 0.001-0.1 weight % $CeO_2$. In another aspect, the photosensitive glass substrate is at least one of: a photodefinable glass substrate comprises at least 0.1 weight % $Sb_2O_3$ or $As_2O_3$; a photo-definable glass substrate comprises 0.003-1 weight % $Au_2O$; a photo-definable glass substrate comprises 1-18 weight % of an oxide selected from the group consisting of CaO, ZnO, PbO, MgO, SrO and BaO; and optionally has an anisotropic-etch ratio of exposed portion to said unexposed portion is at least one of 10-20:1; 21-29:1; 30-45:1; 20-40:1; 41-45:1; and 30-50:1. In another aspect, the photosensitive glass substrate is a photosensitive glass ceramic composite substrate comprising at least one of silica, lithium oxide, aluminum oxide, or cerium oxide. In another aspect, the RF transmission has a loss of less than 50, 40, 30, 25, 20, 15, or 10% of the signal input versus a signal output. In another aspect, the method further comprises forming the RF mechanically and thermally stabilized interdigitated resonate structure into a feature of at least one of a bandpass, low pass, high pass, or notch filter.

In another embodiment, the present invention includes a mechanically stabilized RF coupled interdigitated resonate device made by a method comprising: masking a design layout comprising one or more structures to form one or more interdigitated structures with electrical conduction channels on a photosensitive glass substrate; exposing at least one portion of the photosensitive glass substrate to an activating energy source; heating the photosensitive glass substrate for at least ten minutes above its glass transition temperature; cooling the photosensitive glass substrate to transform at least part of the exposed glass to a crystalline material to form a glass-crystalline substrate; etching the glass-crystalline substrate with an etchant solution to form a mechanical support device; coating the one or more electrical conductive interdigitated transmission line, ground plane and input and output channels with one or more metals; and coating all or part of the one or more electrical conductive interdigitated transmission line with a metallic media, wherein the metal is connected to a circuitry. In one aspect, the device is covered with a lid coating of all or part of the external electrical isolation structure with a metal or metallic media further comprises connecting the metal or metallic media to a ground. In another aspect, the RF filter line has mechanical and thermal stabilization structure is under less than 50%, 40%, 35%, 30%, 25%, 20%, 10%, 5% or 1% of the contact area of the RF interdigitated resonate structure. In another aspect, the metallization forms a transmission line. In another aspect, the RF transmission line interdigitated resonate filter is a bandpass, low pass, high pass, or notch. In another aspect, a metal line on the RF transmission line interdigitated resonate filter is comprised of titanium, titanium-tungsten, chrome, copper, nickel, gold, palladium or silver. In another aspect, the step of etching forms an air gap between the substrate and the RF interdigitated resonate structure, wherein the interdigitated resonate structure is connected to other RF electronic elements. In another aspect, the glass-crystalline substrate adjacent to the trenches may also be converted to a ceramic phase. In another aspect, the one or more metals are selected from Fe, Cu, Au, Ni, In, Ag, Pt, or Pd.

BRIEF DESCRIPTION OF THE DRAWINGS

For a more complete understanding of the features and advantages of the present invention, reference is now made to the detailed description of the invention along with the accompanying figures and in which:

FIG. 1A shows resonate interdigitated 28 GHz bandpass filter. FIG. 1C shows the assembled resonate interdigitated 28 GHz bandpass filter. External Dimensions of 6.6 (1)×3.0 (w)×0.7 (h)mm$^3$.

FIG. 3A shows a symmetric resonate interdigitated Coupled Transmission Line Resonator Filter. FIG. 3B shows an asymmetric resonate interdigitated Coupled Transmission Line Resonator (ICTLR) Filter.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

The present invention relates to creating a compact 50 Ohm resonate filter RF. Compact low loss RF filters are a critical element for compact high efficiency RF communication systems. Compact low loss RF devices are the cornerstone technological requirement for future RF systems particularly for portable systems.

Photosensitive glass structures have been suggested for a number of micromachining and microfabrication processes such as integrated electronic elements in conjunction with other elements systems or subsystems. Semiconductor microfabrication using thin film additive processes on semiconductor, insulating or conductive substrates is expensive with low yield and a high variability in performance. An example of additive micro-transmission can be seen in articles Semiconductor Microfabrication Processes by Tian et al. rely on expensive capital equipment; photolithography and reactive ion etching or ion beam milling tools that generally cost in excess of one million dollars each and require an ultra-clean, high-production silicon fabrication facility costing millions to billions more. This invention provides a cost effective glass ceramic electronic individual device or as an array of passive devices for a uniform response for RF frequencies with low loss.

Figure 1A:
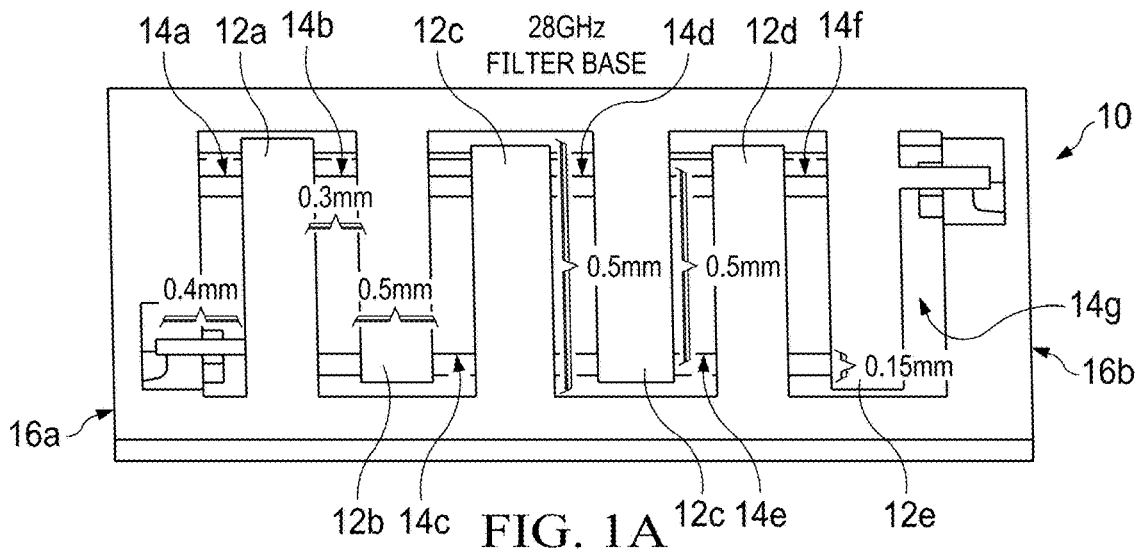
FIGS. 1A and 1C show the lid and bottom view of a compact resonate 28 GHz bandpass filter.
Figure 1B:
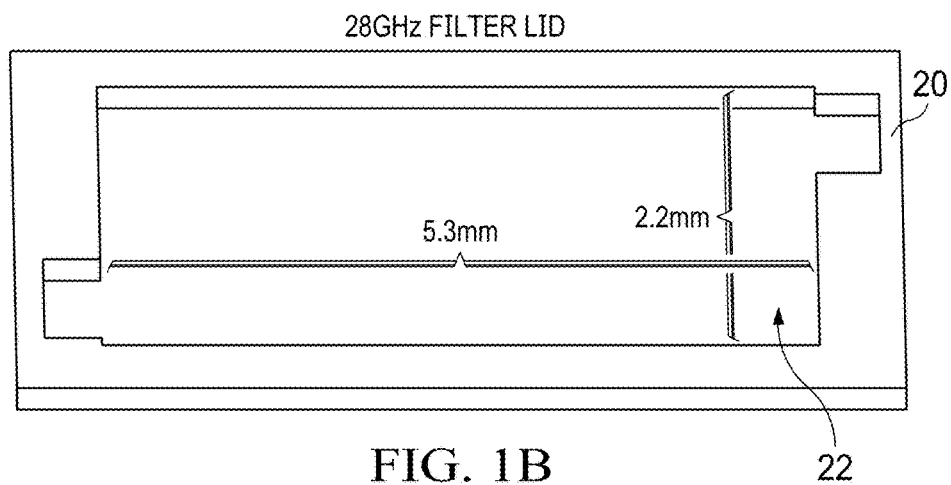
FIG. 1B shows the lid for a resonate interdigitated 28 GHz bandpass filter.
Figure 1C:
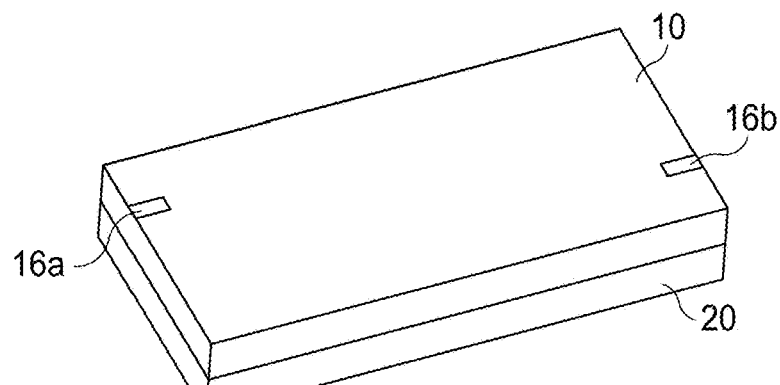
Figure 2:
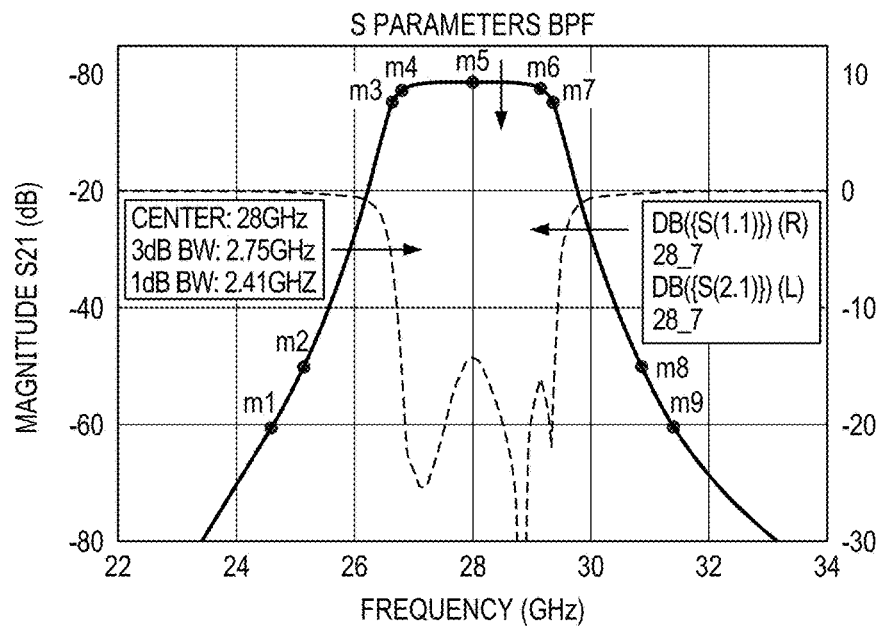
FIG. 2 shows the simulated performance of the 28 Ghz resonate interdigitated bandpass filter.

FIGS. 1A and 1B show the coupled Transmission Line Resonate filter lid and bottom view of a compact 28 GHz RF bandpass filter that shows certain exemplary but not limiting dimensions. FIG. 1A shows an isometric bottom view of the RF bandpass filter 10 that includes the interdigitating metal portions 12a-12e, separated by openings 14a-14g. Electrical contacts or outputs 16a, 16b, are also depicted. The external dimensions of the bandpass filter are: 6.6 (1)×3.0 (w)×0.7 (h) mm$^3$. FIG. 1B shows an isometric view of a lid 20 that includes an opening formed in the lid into which the RF bandpass filter 10 is inserted. FIG. 1C shows the complete assembly 30, including contacts 16A and 16B. FIG. 2 shows the simulated performance of the 28 Ghz resonate interdigitated bandpass filter of the present invention.

Figure 3A:
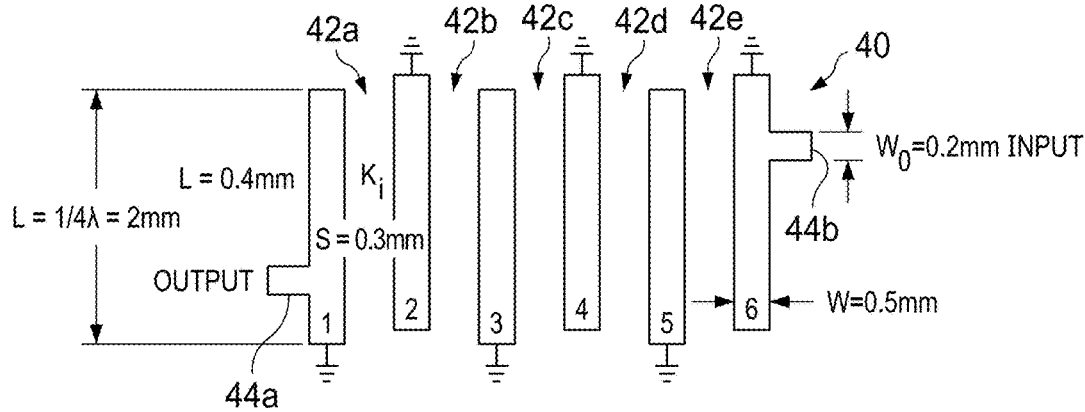
FIGS. 3A and 3B show a theoretical structure of a compact resonate bandpass filter prototype.
Figure 3B:
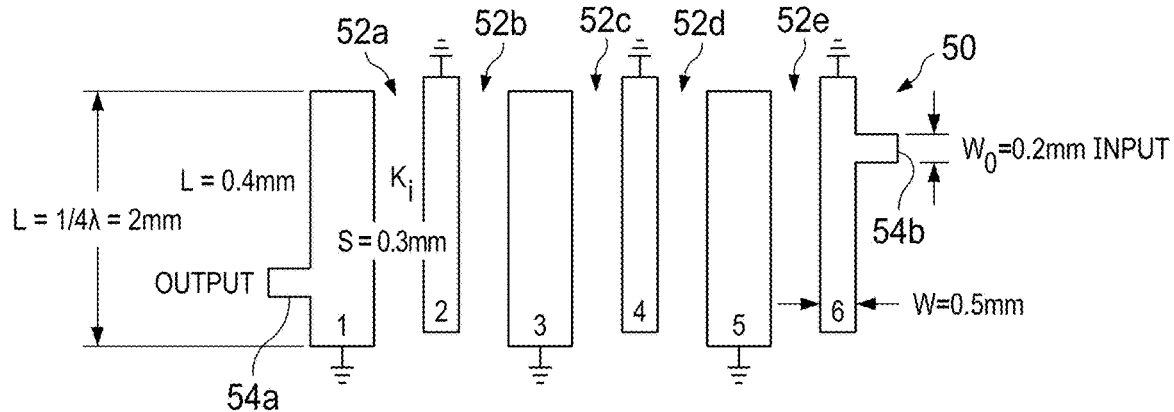

FIGS. 3A and 3B show a theoretical structure of a compact resonate bandpass filter. FIG. 3A shows a symmetric resonate Interdigitated Coupled Transmission Line Resonator Filter (ICTLRF) 40 in which the resonators structures 1, 2, 3, 5, 6 are shown having the same width, having a length L, which are separated by spaces or openings 42a-42e, and outputs 44a, 44b. FIG. 3B shows an asymmetric resonate interdigitated Coupled Transmission Line Resonator Filter 50 in which the resonators structures 1, 2, 3, 5, 6 are shown having the varying widths, having a length L, which are separated by spaces or openings 42a-42e, and outputs 44a, 44b.

The interdigitated resonate RF filter is one of the most compact filter structures. This is because the resonators structures are on the side length L, where L is equal to ¼ λ, where λ, is the center frequency filter. The filter configuration shown in FIGS. 3A and 3B includes of an array of n TEM mode or quasi-TEM-mode resonate transmission line. In FIGS. 3A and 3B each element has an electrical length 90° at center frequency relative to its adjacent element. In general, the physical dimensions of the line elements or the resonators can be the same or may be different depending on the intent of the design. For the bandpass filter designed and manufactured herein uses the same spacing. The coupling of the signal is achieved by the way of the fields fringing interacting with the adjacent resonators lines. The separation between the lines/resonators is given by $S_{i+1}$ for i=0 . . . n−1. The number of poles for the filter is given by $S_{i+1}$ elements. The design of the bandpass filter shown in FIG. 1A is a 6-pole filter, but the skilled artisan will understand that the number can be 2, 3, 4, 5, 6, 7, 8, 9, 10, 11, 12 or more pole filters depending on the specific design needs. Increasing the number of poles will increase the rise and fall rate of the filter but will also increase the insertion loss. The insertion loss will increase by about 0.2 dB for every additional pole added to the filter. The filter design shown in FIG. 1A and its associated design performance shown in FIG. 2 has an insertion loss of ~2 dB and a stop band and rates of cutoff of 60 dB in 2.5 GHz. These performance attributes can be simply modified by changing the filter design. What cannot be changed for this type of filter is the requirement to have a low loss dielectric material (such as air or vacuum) surrounding the resonate elements and for the resonate elements to me mechanically ridged with smooth surfaces. If the resonate elements bend, or distort during operation from heat, vibration or other sources then the filter's performance is severely degraded.

Traditional interdigitated band pass filters are compact relative to other forms of RF filters with relaxed tolerances using traditional machining and finishing techniques because of the relatively large spacing between resonator elements. Precision machining metal and electropolished for surface finish easily produce self-supporting resonate elements that have no supporting dielectric material. Using traditional thin film or additive manufacturing technology produce resonate elements that are not mechanically or dimensionally stable. This mechanical or dimensional instability forced the use of a solid dielectric substrate, such as quartz to produce resonate elements for a filter creating large insertion losses well in excess of 10 dB. This level of loss has precluded the use of a resonate interdigitated transmission line band pass filters in commercial markets.

$W_0$ is the width of characteristic impedance, W is the width of resonator, $K_i$ is the coupling efficiency $S_{i-1}$ is the space between resonator, and L is the length of resonator.

The present invention includes a method of making a mechanically stabilized RF coupled interdigitated resonate device comprising: masking a design layout comprising one or more structures to form one or more interdigitated structures with electrical conduction channels on a photosensitive glass substrate; exposing at least one portion of the photosensitive glass substrate to an activating energy source; heating the photosensitive glass substrate for at least ten minutes above its glass transition temperature; cooling the photosensitive glass substrate to transform at least part of the exposed glass to a crystalline material to form a glass-crystalline substrate; etching the glass-crystalline substrate with an etchant solution to form a mechanical support device; and coating the one or more electrical conductive interdigitated transmission line, ground plane and input and output channels with one or more metals, wherein the metal is connected to a circuitry. The device can be covered with a lid covering all or part of the external electrical isolation structure with a metal or metallic media further comprises connecting the metal or metallic media to a ground. The RF filter line has mechanical and thermal stabilization structure is under less than 50%, 40%, 35%, 30%, 25%, 20%, 10%, 5% or 1% of the contact area of the RF interdigitated resonate structure. The metallization forms a transmission line, e.g., the RF transmission line that is an interdigitated resonate filter is a bandpass, low pass, high pass, or notch. A metal line on the RF transmission line interdigitated resonate filter is comprised of titanium, titanium-tungsten, chrome, copper, nickel, gold, palladium or silver. In another aspect, the step of etching forms an air gap between the substrate and the RF interdigitated resonate structure, wherein the interdigitated resonate structure is connected to other RF electronic elements The glass-crystalline substrate adjacent to the trenches may also be converted to a ceramic phase. The one or more metals are selected from Fe, Cu, Au, Ni, In, Ag, Pt, or Pd. The metal can be connected to the circuitry through a surface a buried contact, a blind via, a glass via, a straight line contact, a rectangular contact, a polygonal contact, or a circular contact. The photosensitive glass substrate is a glass substrate comprising a composition of: 60-76 weight % silica; at least 3 weight % $K_2O$ with 6 weight %-16 weight % of a combination of $K_2O$ and $Na_2O$; 0.003-1 weight % of at least one oxide selected from the group consisting of $Ag_2O$ and $Au_2O$; 0.003-2 weight % $Cu_2O$; 0.75 weight %-7 weight % $B_2O_3$, and 6-7 weight % $Al_2O_3$; with the combination of $B_2O_3$; and $Al_2O_3$ not exceeding 13 weight %; 8-15 weight % $Li_2O$; and 0.001-0.1 weight % $CeO_2$. The photosensitive glass substrate is a glass substrate comprising a composition of: 35-76 weight % silica, 3-16 weight % $K_2O$, 0.003-1 weight % $Ag_2O$, 8-15 weight % $Li_2O$, and 0.001-0.1 weight % $CeO_2$. The photosensitive glass substrate is at least one of: a photo-definable glass substrate comprises at least 0.1 weight % $Sb_2O_3$ or $As_2O_3$; a photo-definable glass substrate comprises 0.003-1 weight % $Au_2O$; a photo-definable glass substrate comprises 1-18 weight % of an oxide selected from the group consisting of CaO, ZnO, PbO, MgO, SrO and BaO; and optionally has an anisotropic-etch ratio of exposed portion to said unexposed portion is at least one of 10-20:1; 21-29:1; 30-45:1; 20-40:1; 41-45:1; and 30-50:1. The photosensitive glass substrate is a photosensitive glass ceramic composite substrate comprising at least one of silica, lithium oxide, aluminum oxide, or cerium oxide. The RF transmission has a loss of less than 50, 40, 30, 25, 20, 15, or 10% of the signal input versus a signal output. The method may further include forming the RF mechanically and thermally stabilized interdigitated resonate structure into a feature of at least one of a bandpass, low pass, high pass, or notch filter.

The present invention includes a method to fabricate to compact RF interdigitated resonate band pass filters in a photodefinable glass ceramic substrate. To produce the present invention the inventors developed a glass ceramic (APEX® Glass ceramic) as a novel packaging and substrate material for semiconductors, RF electronics, microwave electronics, and optical imaging. APEX® Glass ceramic is processed using first generation semiconductor equipment in a simple three step process and the final material can be fashioned into either glass, ceramic, or contain regions of both glass and ceramic. Photo-etchable glasses have several advantages for the fabrication of a wide variety of microsystems components.

Microstructures have been produced relatively inexpensively with these glasses using conventional semiconductor processing equipment. In general, glasses have high temperature stability, good mechanical a n d electrically properties, and have better chemical resistance than plastics and many metals. Photoetchable glass is comprised of lithium-aluminum-silicate glass containing traces of silver ions. When exposed to UV-light within the absorption band of ceriumoxide, the ceriumoxide acts as sensitizers, absorbing a photon and losing an electron that reduces neighboring silver oxide to form silver atoms, e.g.,

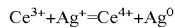

$Ce^{3+}+Ag^+=Ce^{4+}+Ag^0$

The silver atoms coalesce into silver nanoclusters during the baking process and induce nucleation sites for crystallization of the surrounding glass. If exposed to UV light through a mask, only the exposed regions of the glass will crystallize during subsequent heat treatment.

This heat treatment must be performed at a temperature near the glass transformation temperature (e.g. Greater than 465° C. in air). The crystalline phase is more soluble in etchants, such as hydrofluoric acid (HF), than the unexposed vitreous, amorphous regions. The crystalline regions etched greater than 20 times faster than the amorphous regions in 10% HF, enabling microstructures with wall slopes ratios of about 20:1 when the exposed regions are removed. See T. R. Dietrichetal, "Fabrication Technologies for Microsystems utilizing Photoetchable Glass", Microelectronic Engineering 30,497 (1996), which is incorporated herein by reference.

In general, photoetchable glass and is composed of silicon oxide ($SiO_2$) of 75-85% by weight, lithium oxide ($Li_2O$) of 7-11% by weight, aluminum oxide ($Al_2O_3$) of 3-6% by weight, sodium oxide ($Na_2O$) of 1-2% by weight, 0.2-0.5% by weight antimonium trioxide ($Sb_2O_3$) or arsenic oxide ($As_2O_3$), silver oxide ($Ag_2O$) of 0.05-0.15% by weight, and cerium oxide ($CeO_2$) of 0.01-0.04% by weight. As used herein the terms "APEX® Glass ceramic", "APEX glass" or simply "APEX" is used to denote one embodiment of the glass ceramic composition of the present invention.

The APEX composition provides three main mechanisms for its enhanced performance: (1) The higher amount of silver leads to the formation of smaller ceramic crystals which are etched faster at the grain boundaries, (2) the decrease in silica content (the main constituent etched by the HF acid) decreases the undesired etching of unexposed material, and (3) the higher total weight percent of the alkali metals and boronoxide produces a much more homogeneous glass during manufacturing.

The present invention includes a method for fabricating a low loss RF Filter structure in APEX Glass structure for use in forming interdigitated structures with mechanical stabilization and electrical isolation in a glass ceramic material used. The present invention includes interdigitated structures to create in multiple planes of a glass-ceramic substrate, such process employing the (a) exposure to excitation energy such that the exposure occurs at various angles by either altering the orientation of the substrate or of the energy source, (b) a bake step and (c) an etch step. Interdigitate can be either symmetric or asymmetric. The mechanically stabilized interdigitated structures are difficult, if not infeasible to create in most glass, ceramic or silicon substrates. The present invention has created the capability to create such structures in both the vertical as well as horizontal plane for glass-ceramic substrates.

Ceramicization of the glass is accomplished by exposing a region of the APEX Glass substrate to approximately 20 $J/cm^2$ of 310 nm light. In one embodiment, the present invention provides a quartz/chrome mask containing a variety of concentric circles with different diameters.

The present invention includes a method for fabricating a compact efficient RF filters using mechanically stabilized interdigitated resonate structures connect different electronic devices fabricated in or attached to the photosensitive glass. The photosensitive glass substrate can have a wide number of compositional variations including but not limited to: 60-76 weight % silica; at least 3 weight % $K_2O$ with 6 weight %-16 weight % of a combination of $K_2O$ and $Na_2O$; 0.003-1 weight % of at least one oxide selected from the group consisting of $Ag_2O$ and $Au_2O$; 0.003-2 weight % $Cu_2O$; 0.75 weight %-7 weight % $B_2O_3$, and 6-7 weight % $Al_2O_3$; with the combination of $B_2O_3$; and $Al_2O_3$ not exceeding 13 weight %; 8-15 weight % $Li_2O$; and 0.001-0.1 weight % $CeO_2$. This and other varied compositions are generally referred to as the APEX glass.

The exposed portion may be transformed into a crystalline material by heating the glass substrate to a temperature near the glass transformation temperature. When etching the glass substrate in an etchant such as hydrofluoric (HF) acid, the anisotropic-etch ratio of the exposed portion to the unexposed portion is at least 30:1 when the glass is exposed to a broad spectrum mid-ultraviolet (about 308-312 nm) flood lamp to provide a shaped glass structure that have an aspect ratio of at least 30:1, and to provide a lens shaped glass structure. The exposed glass is then baked typically in a two-step process. Temperature range heated between of 420° C.-520° C. for between 10 minutes to 2 hours, for the coalescing of silver ions into silver nanoparticles and temperature range heated between 520° C.-620° C. for between 10 minutes and 2 hours allowing the lithiumoxide to form around the silver nanoparticles. The glass plate is then etched. The glass substrate is etched in an etchant, of HF solution, typically 5% to 10% by volume, where in the etch ratio of exposed portion to that of the unexposed portion is at least 30:1. Create the mechanically and thermally stabilized interdigitated resonate structure through thin film additive and subtractive processes requires the general processing approach.

Figure 4:
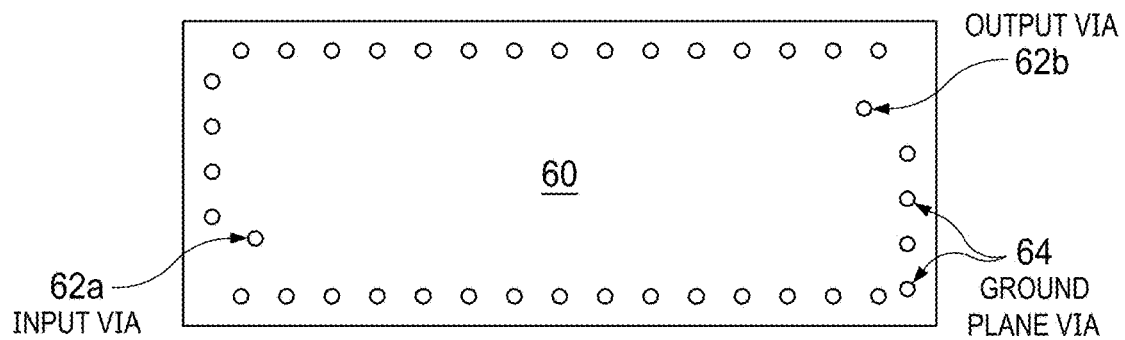
FIG. 4 shows the bottom of the ICTLR filter with the ground plane and I/O via.

FIG. 4 shows the bottom 60 of the interdigitated Coupled Transmission Line Resonator Filter (ICTLRF) with the ground plane vias 64, and I/O vias 62a and 62b. A method of making the ICTLRF starts with a lap and polished photodefinable glass. There are many RF filter die on a single wafer the specific number of die are a function of the wafer diameter. The substrate is 6" in diameter is exposed with approximately 20 $J/cm^2$ of 310 nm light. The photo mask has a pattern of through hole via that are 50 µm in diameter 500 µm apart center-to-center and 300 µm in from the exterior of the die on the wafer.

The wafer is then annealed at temperature range heated between of 420° C.-520° C. for between 10 minutes to 2 hours, for the coalescing of silver ions into silver nanoparticles and temperature range heated between 520° C.-620° C. for between 10 minutes and 2 hours allowing the lithium oxide to form around the silver nanoparticles. The wafer is then cooled and placed into an HF bath to etch the ceramic portion of the wafer. The wafer is then placed into a CVD deposition system for a deposition between 200 Å and 10,000 Å thick of titanium. The wafer is then coated with a photoresist and the via pattern is exposed and developed. The wafer is then placed into a copper-electroplating bath where between 25 µm and 35 µm of copper are deposited. The photoresist is then removed lifting off the majority of the cooper and leaving the cooper filled via. The wafer is then lapped and polished to remove any excess copper and planarize the surface of the glass and cooper filled via.

The wafer is then exposed with approximately 20 J/cm² of 310 nm light to a photo mask consisting of a rectangular pattern of ~5.3 mm by 2.2 mm of exposed glass 74 separated with two parallel lines 72 (150 µm wide) of unexposed glass that are approximately 200 µm from the edge of the rectangle pattern. The 150 µm wide glass structure is the mechanical and thermal stabilization element for the interdigitated resonate structure. The contact area between the interdigitated resonate and glass stabilization structure represents about 2% of the surface area contact to the final metal interdigitated resonate structure. The greater the stabilization structure, the higher the RF losses. As such we elect not to make the stabilization structure greater than 50% of the contact area of the interdigitated resonate structure and preferably less than 1%. Less than 1% is achievable with 3DGS' technology, as we have demonstrated 7 µm diameter pedestals that are over 400 µm high further reducing the insertion loss from 2.2 dB for the 6-pole bandpass filter demonstrated in FIG. 3.

The wafer is then annealed under an inert gas (e.g., Argon) at temperature range heated between of 420° C.-520° C. for between 10 minutes to 2 hours, for the coalescing of silver ions into silver nanoparticles and temperature range heated between 520° C.-620° C. for between 10 minutes and 2 hours allowing the lithium oxide to form around the silver nanoparticles. The wafer is then cooled and coated with photoresist and expose to the interdigitated resonate and ground plane pattern. The wafer with the interdigitated transmission line resonate pattern and ground plane (front and backside metallization connected by through glass via) and electrical contact pads are patterned in the photoresist, is then coated with 200 Å and 10,000 Å thick of titanium using CVD. The wafer is then placed into a copper electroplating bath where cooper is deposited at a thickness between 0.5 µm and 10 µm. The photoresist is then removed leaving the cooper coated titanium interdigitated transmission line resonate structure and ground plane and any unwanted remaining seed layer is removed using any number of well-established techniques.

The ceramic portion of the exposed/converted glass is then etched away using 10% HF solution leaving the interdigitated, ground plane and input and output structures. The wafer is then rinsed and dried using DI water and IPA.

Figure 5:
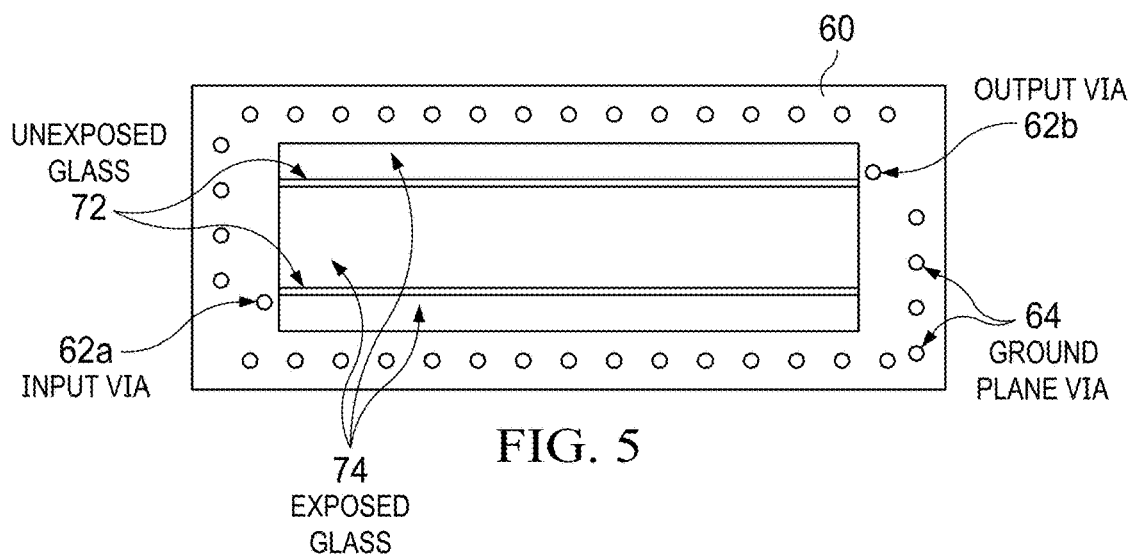
FIG. 5 shows the structure of the ICLTR filter prior to the coating step.

FIG. 5 shows the bottom 60 of the interdigitated Coupled Transmission Line Resonator Filter (ICTLRF) with the ground plane vias 64, and I/O vias 62a and 62b, and also depicts the portions of the glass that is unexposed glass 72, and exposed glass 74.

Figure 6:
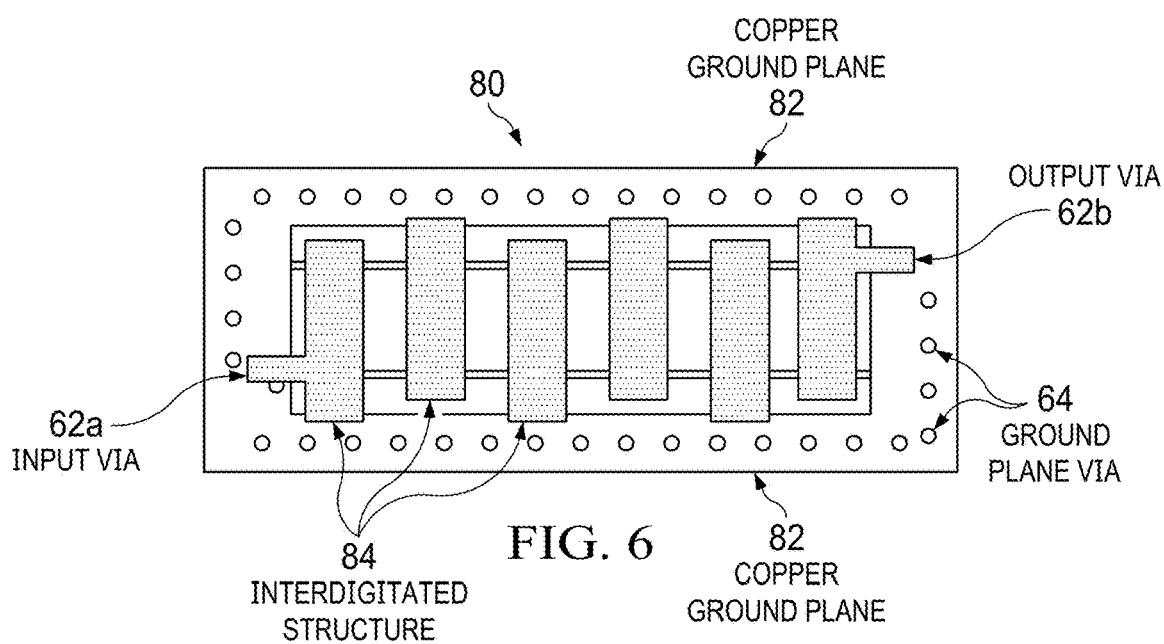
FIG. 6 shows a bottom view of the lid/top for the interdigitated RF filter.

FIG. 6 shows the final interdigitated Coupled Transmission Line Resonator Filter 80 (before adding the lid) with the ground plane vias 64, and I/O vias 62a and 62b, the metal ground plate 82 (which can be, e.g., copper, gold, silver, aluminum, or alloys), the interdigitating structures 84 and also depicts the portions of the glass that provide structural support for the interdigitating structures 84, in addition to the openings between the interdigitating structures 84.

Figure 7:
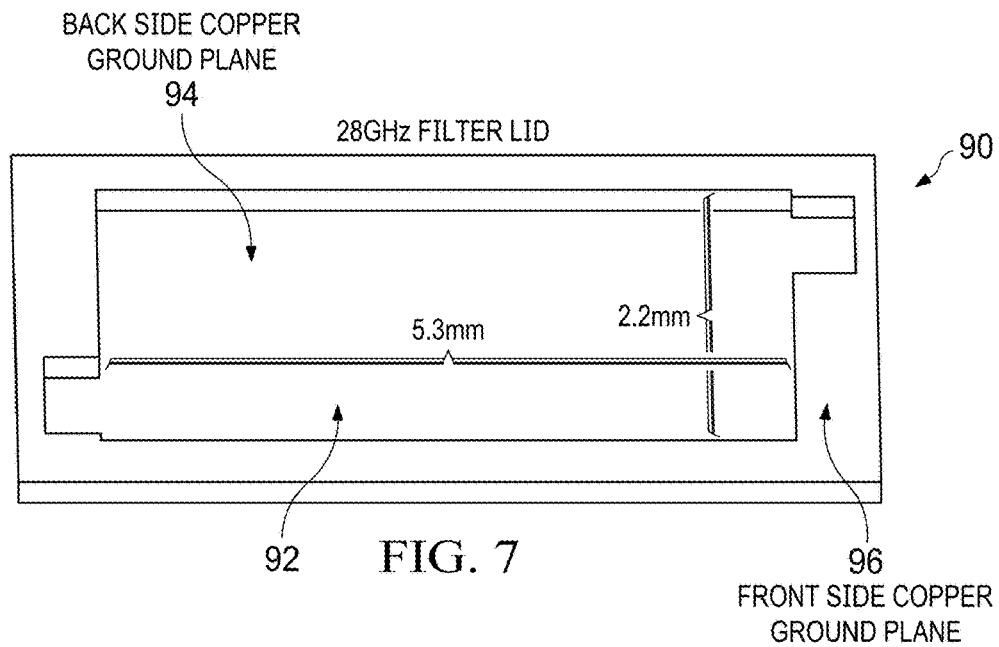
FIG. 7 shows the lid of the 28 GHz interdigitated RF filter.

FIG. 7 shows a bottom view of the lid/top 90 for the interdigitated RF filter that includes an opening 92 and can include both a backside metal ground plane 94 and front side metal ground plane 96. The method of making the interdigitated RF filter starts with a lap and polished photodefinable glass. There are many RF filter die on a single wafer the specific number of die are a function of the wafer diameter. The substrate is 6" in diameter is exposed with approximately 20 J/cm² of 310 nm light. The photo mask has a pattern of through hole via that are 50 µm in diameter 500 µm apart center to center and 300 µm in from the exterior of the die on the wafer.

The wafer is then annealed at temperature range heated between of 420° C.-520° C. for between 10 minutes to 2 hours, for the coalescing of silver ions into silver nanoparticles and temperature range heated between 520° C.-620° C. for between 10 minutes and 2 hours allowing the lithium oxide to form around the silver nanoparticles. The wafer is then cooled and placed into a 10% HF bath to etch the ceramic portion of the wafer. The wafer is then placed into a CVD deposition system for a deposition between 200 Å and 10,000 Å thick of titanium. The wafer is then coated with a photoresist and the via pattern is exposed and developed. The wafer is then placed into a copper-electroplating bath where between 25 µm and 35 µm of copper are deposited. The photoresist is then removed lifting off the majority of the cooper and leaving the cooper filled via. The wafer is then lapped and polished to remove any excess copper and planarize the surface of the glass and cooper filled via.

The wafer is then exposed with approximately 20 J/cm² of 310 nm light to a photo mask consisting of a rectangular pattern of ~5.3 mm by ~2.2 mm. As can be seen in FIG. 7. The wafer is then annealed, in Argon at temperature range heated between of 420° C.-520° C. for between 10 minutes to 2 hours, for the coalescing of silver ions into silver nanoparticles and temperature range heated between 520° C.-620° C. for between 10 minutes and 2 hours allowing the lithium oxide to form around the silver nanoparticles. The wafer is then cooled. A photoresist is then coated on the front of the wafer and the lid pattern is exposed and developed. The remaining photoresist covers the exposed and converted ceramic. Both sides of the wafer are coated with 200 Å and 10,000 Å thick of titanium using CVD process. The wafer is then placed into a copper-electroplating bath where cooper is deposited at a thickness between 0.5 µm and 20 µm. The photoresist is then removed lifting off the majority of the cooper and leaving the converted ceramic exposed and any unwanted remaining seed layer is removed using any number of well-established techniques. The ceramic portion of the exposed/converted glass is then etched away using 10% HF solution leaving the ground plane structures. The wafer is then rinsed and dried using DI water and IPA. In certain embodiments, the RF filter line has mechanical and thermal stabilization structure is under less than 50%, 40%, 35%, 30%, 25%, 20%, 10%, 5% or 1% of the contact area of the RF interdigitated resonate structure.

The lid and bases of the 28 GHz interdigitated RF filter can be diced out of the wafers. A lid can be coated with a solder, e.g., a gold tin solder, on the external edge. The lid is then placed on the base and sealed using a thermal sealer. Thus, the present invention has built and simulated a coupled transmission line resonate filter using air and glass as the dielectric material.

The present inventors used a photo-definable glass ceramic (APEX®) Glass Ceramic or other photo definable glass as a novel substrate material for semiconductors, RF electronics, microwave electronics, electronic components and/or optical elements. In general, a photo definable glass is processed using first generation semiconductor equipment in a simple three step process and the final material can be fashioned into either glass, ceramic, or contain regions of both glass and ceramic. A coupled transmission line resonate structures enable a wide number of filters, e.g.: Bandpass, Notch, Low Pass, and High Pass used in RF circuits at frequencies from MHz to THz devices while reducing the size, cost and power consumption.

Figure 8:
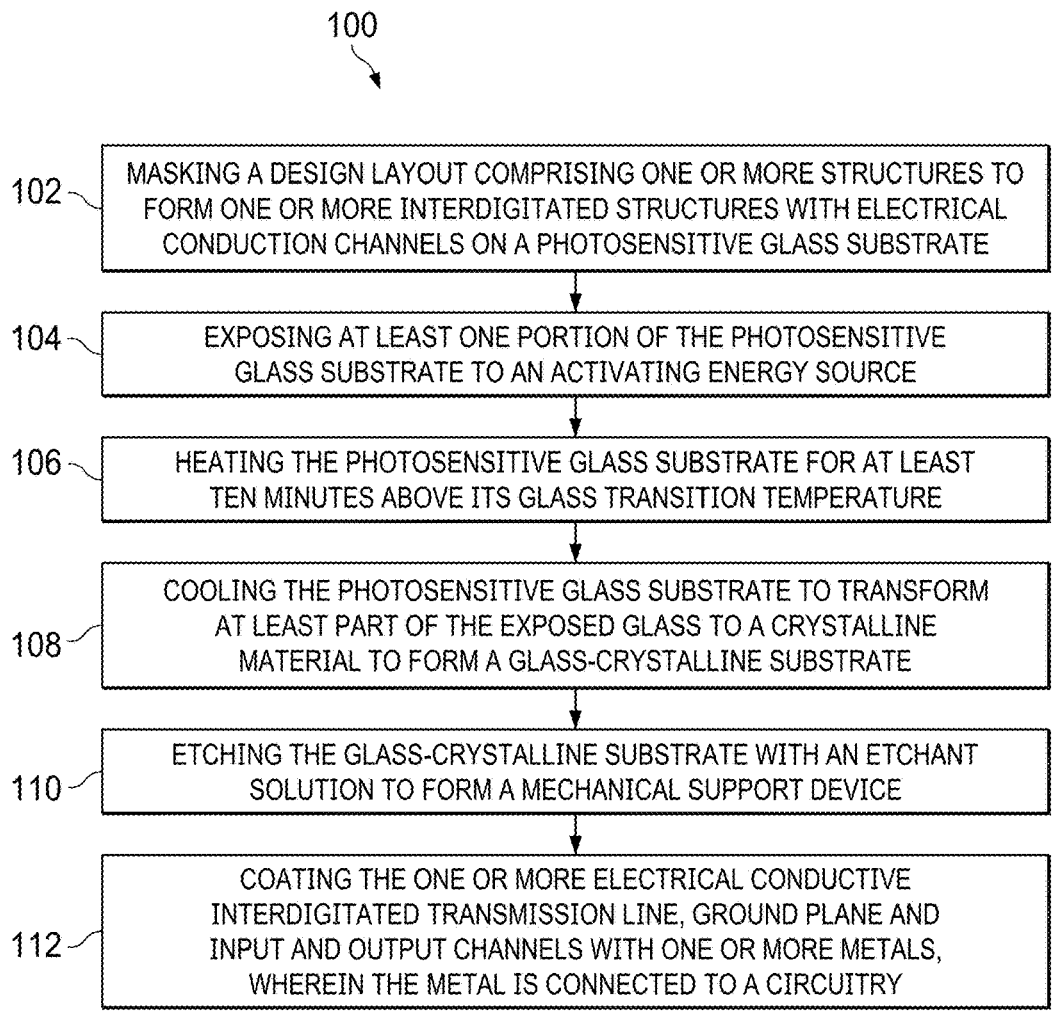
FIG. 8 shows a flowchart of the method of the present invention.

FIG. 8 shows a flowchart 100 of the method of the present invention, in which Step 102 includes masking a design layout comprising one or more structures to form one or more interdigitated structures with electrical conduction channels on a photosensitive glass substrate. Next, in step 104, exposing at least one portion of the photosensitive glass substrate to an activating energy source. In step 106, heating the photosensitive glass substrate for at least ten minutes above its glass transition temperature. In step 108, cooling the photosensitive glass substrate to transform at least part of the exposed glass to a crystalline material to form a glass-crystalline substrate. In step 110, etching the glass-crystalline substrate with an etchant solution to form a mechanical support device. Finally, in step 112, coating the one or more electrical conductive interdigitated transmission line, ground plane and input and output channels with one or more metals. The device thus formed can then be covered with a lid that includes ground plates connected to ground.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), qjcharacteristic(s), property(ies), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. A method of making a mechanically stabilized RF coupled interdigitated resonant device comprising:
    providing a photosensitive glass substrate;
    masking a design layout comprising one or more interdigitated structures to form one or more interdigitated resonators on the photosensitive glass substrate, wherein each interdigitated resonator is rectangular, and wherein adjacent interdigitated resonators are configured and disposed to couple a signal of a frequency of about 26 to 30 GHz;
    exposing at least one portion of the photosensitive glass substrate to an activating energy source;
    heating the photosensitive glass substrate for at least ten minutes above a glass transition temperature thereof;
    cooling the photosensitive glass substrate to transform at least part of the exposed glass to a crystalline material to form a glass-crystalline substrate;
    etching the glass-crystalline substrate with an etchant solution to form a glass mechanical support structure from the photosensitive glass substrate; and
    coating the one or more interdigitated structures, a ground plane, an input channel, and an output channel with one or more metals, wherein the one or more metals are configured to be connected to a circuitry.

2. The method of claim 1, further comprising covering all or part of an external electrical isolation structure of the device with a metal or metallic media lid; and grounding the metal or metallic media lid.

3. The method of claim 1, wherein the mechanical support structure has a contact area with the one or more interdigitated structures that is less than 50%, 40%, 35%, 30%, 25%, 20%, 10%, 5% or 1% of a contact area of the one or more interdigitated structures.

4. The method of claim 1, wherein the coating the one or more interdigitated structures forms the one or more interdigitated resonators.

5. The method of claim 1, wherein the one or more interdigitated resonators form a bandpass filter, a low-pass filter, a high-pass filter, or a notch filter.

6. The method of claim 5, wherein the one or more interdigitated resonators comprise titanium, titanium-tungsten, chrome, copper, nickel, gold, palladium, or silver.

7. The method of claim 1, wherein the step of etching forms an air gap between the photosensitive glass substrate and the one or more interdigitated structures.

8. The method of claim 1, further comprising converting the glass-crystalline substrate adjacent to the one or more interdigitated structures to a ceramic phase.

9. The method of claim 1, wherein the one or more metals are selected from iron, copper, gold, nickel, indium, silver, platinum, or palladium.

10. The method of claim 1, wherein the one or more metals are configured to be connected to the circuitry through a surface a buried contact, a blind via, a glass via, a straight line contact, a rectangular contact, a polygonal contact, or a circular contact.

11. The method of claim 1, wherein the photosensitive glass substrate comprises a composition of: 60 to 76 weight % silica; at least 3 weight % $K_2O$ with 6 to 16 weight weight % of a combination of $K_2O$ and $Na_2O$; 0.003 to 1 weight % of at least one oxide selected from the group consisting of $Ag_2O$ and $Au_2O$; 0.003 to 2 weight % $Cu_2O$; 0.75 to 7 weight % $B_2O_2$, and 6 to 7 weight % $Al_2O_3$, with the combination of $B_2O_3$; and $Al_2O_3$ not exceeding 13 weight %; 8 to 15 weight % $Li_2O$; and 0.001 to 0.1 weight % $CeO_2$.

12. The method of claim 1, wherein the photosensitive glass substrate comprises a composition of: 35 to 76 weight % silica, 3 to 16 weight % $K_2O$, 0.003 to 1 weight % $Ag_2O$, 8 to 15 weight % $Li_2O$, and 0.001 to 0.1 weight % $CeO_2$.

13. The method of claim 1, wherein the photosensitive glass substrate comprises at least one of: at least 0.1 weight % $Sb_2O_3$ or $As_2O_3$; 0.003 to 1 weight % $Au_2O$; 1 to 18 weight % of an oxide selected from the group consisting of CaO, ZnO, PbO, MgO, SrO, and BaO; and an anisotropic-etch ratio of an exposed portion to an unexposed portion at least one of 10 to 20:1; 21 to 29:1; 30 to 45:1; 20 to 40:1; 41 to 45:1; and 30 to 50:1.

14. The method of claim 1, wherein the photosensitive glass substrate is a photosensitive glass ceramic composite substrate comprising at least one of silica, lithium oxide, aluminum oxide, or cerium oxide.

15. The method of claim 1, wherein an RF transmission through the mechanically stabilized RF coupled interdigitated resonant device has a loss of less than 50, 40, 30, 25, 20, 15, or 10% of a signal input versus a signal output.

16. The method of claim 1, the one or more interdigitated resonators form a feature of a bandpass filter, a low-pass filter, a high-pass filter, or a notch filter.

17. A mechanically stabilized RF coupled interdigitated resonant device made by a method comprising:
    providing a photosensitive glass substrate;
    masking a design layout comprising one or more structures to form one or more interdigitated resonators on the photosensitive glass substrate, wherein each interdigitated resonator is rectangular, and wherein adjacent interdigitated resonators are configured and disposed to couple a signal of a frequency of about 26 to 30 GHz;
    exposing at least one portion of the photosensitive glass substrate to an activating energy source;
    heating the photosensitive glass substrate for at least ten minutes above glass transition temperature thereof;
    cooling the photosensitive glass substrate to transform at least part of the exposed glass to a crystalline material to form a glass-crystalline substrate;
    etching the glass-crystalline substrate with an etchant solution to form a glass mechanical support structure from the photosensitive glass substrate;
    coating the one or more interdigitated structures, a ground plane, an input channel, and an output channel with one or more metals; and
    connecting the mechanically stabilized RF coupled interdigitated resonant device to a circuitry.

18. The device of claim 17, wherein the method for making the device further comprises covering all or part of an external electrical isolation structure of the device with a metal or metallic media lid; and grounding the metal or metallic media lid.

19. The device of claim 17, wherein the mechanical support structure has a contact area with the one or more interdigitated structures that is less than 50%, 40%, 35%, 30%, 25%, 20%, 10%, 5% or 1% of the contact area of the one or more interdigitated structures.

20. The device of claim 17, wherein the coating the one or more interdigitated structures forms the one or more interdigitated resonators.

21. The device of claim 17, wherein the one or more interdigitated resonators form a bandpass filter, a high-pass filter, a low-pass filter, or a notch filter.

22. The device of claim 21, wherein the one or more interdigitated resonators comprise titanium, titanium-tungsten, chrome, copper, nickel, gold, palladium, or silver.

23. The device of claim 17, wherein the step of etching forms an air gap between the photosensitive glass substrate and the one or more interdigitated structures.

24. The device of claim 17, wherein the method further comprises converting the glass-crystalline substrate adjacent to the one or more interdigitated structures to a ceramic phase.

25. The device of claim 17 wherein the one or more metals are selected from iron, copper, gold, nickel, indium, silver, platinum, or palladium.

* * * * *